United States Patent
Hasler et al.

(10) Patent No.: US 12,503,957 B2
(45) Date of Patent: Dec. 23, 2025

(54) TURBINE

(71) Applicant: Cummins Ltd., London (GB)

(72) Inventors: Craig Stuart Thornhill Hasler, London (GB); Nicholas Kenneth Sharp, London (GB)

(73) Assignee: Cummins Ltd., London (GB)

( * ) Notice: Subject to any disclaimer, the term of this patent is extended or adjusted under 35 U.S.C. 154(b) by 0 days.

(21) Appl. No.: 17/623,506

(22) PCT Filed: Jun. 26, 2020

(86) PCT No.: PCT/EP2020/068099
§ 371 (c)(1),
(2) Date: Dec. 28, 2021

(87) PCT Pub. No.: WO2020/260633
PCT Pub. Date: Dec. 30, 2020

(65) Prior Publication Data
US 2022/0333498 A1 Oct. 20, 2022

(30) Foreign Application Priority Data
Jun. 28, 2019 (GB) ..................... 1909345

(51) Int. Cl.
*F01D 17/14* (2006.01)
*F01D 9/02* (2006.01)

(52) U.S. Cl.
CPC ............. *F01D 17/143* (2013.01); *F01D 9/02* (2013.01); *F01D 9/026* (2013.01);
(Continued)

(58) Field of Classification Search
CPC ...... F01D 9/026; F01D 17/143; F02B 37/025; F02B 37/22
See application file for complete search history.

(56) References Cited

U.S. PATENT DOCUMENTS 2,739,782 A * 3/1956 White .................... F01D 9/045
415/150
5,025,629 A 6/1991 Woollenweber
(Continued)

FOREIGN PATENT DOCUMENTS

CN 107762578 A 3/2018
DE 102008060943 A1 * 6/2010 ............ F01D 9/026
(Continued)

OTHER PUBLICATIONS

International Preliminary Report on Patentability received for PCT Patent Application No. PCT/EP2020/068099, mailed on Jan. 6, 2022, 7 pages.
(Continued)

*Primary Examiner* — Christopher R Legendre
(74) *Attorney, Agent, or Firm* — Faegre Drinker Biddle & Reath LLP

(57) ABSTRACT

A variable geometry turbine comprising: a wheel supported for rotation about an axis; a housing comprising a first volute for receiving gas from a first source and a second volute for receiving gas from a second source; the first and second volutes being separated by a dividing wall; and an inlet passageway surrounding the wheel and fluidly connected to the volutes; the inlet passageway at least partially defined between a first wall and an opposite second wall, the first wall being moveable along the axis to vary the size of the inlet passageway; wherein a tip of the dividing wall defines a first radius relative to the axis, and a radially outermost part of the first wall positioned within the inlet passageway defines a second radius relative to the axis, and wherein the first radius is at least around 1% larger than the second radius.

24 Claims, 7 Drawing Sheets

(52) U.S. Cl.
CPC .... *F05D 2220/40* (2013.01); *F05D 2240/128* (2013.01); *F05D 2260/60* (2013.01)

(56) References Cited

U.S. PATENT DOCUMENTS

| | | | |
|---|---|---|---|
| 6,715,288 B1 | 4/2004 | Engels et al. | |
| 7,186,076 B2 * | 3/2007 | Doring | F01D 17/20 415/158 |
| 7,562,529 B2 * | 7/2009 | Kuspert | F02B 37/025 60/602 |
| 8,186,943 B2 * | 5/2012 | Fledersbacher | F02C 9/18 415/158 |
| 8,291,703 B2 * | 10/2012 | Garrett | F01D 17/167 60/602 |
| 8,621,863 B2 * | 1/2014 | Kratschrner | F02B 37/025 60/605.1 |
| 8,919,119 B2 * | 12/2014 | Sun | F01D 17/167 415/161 |
| 9,016,060 B2 * | 4/2015 | Sauerstein | F01D 17/165 415/206 |
| 9,752,537 B2 * | 9/2017 | Dale | F02M 26/43 |
| 2003/0000211 A1 * | 1/2003 | Drangel | F02B 37/18 60/602 |
| 2005/0169747 A1 | 8/2005 | Doring | |
| 2008/0000229 A1 | 1/2008 | Kuspert et al. | |
| 2011/0232282 A1 | 9/2011 | Anschel et al. | |
| 2013/0129497 A1 | 5/2013 | Keller | |
| 2022/0333498 A1 * | 10/2022 | Hasler | F01D 9/026 |

FOREIGN PATENT DOCUMENTS

| | | | |
|---|---|---|---|
| DE | 102014208289 A1 | 11/2014 | |
| DE | 102014012980 A1 | 3/2016 | |
| EP | 2749757 A1 | 7/2014 | |
| GB | 2001397 A * | 1/1979 | F01D 9/026 |
| GB | 2568733 A | 5/2019 | |
| JP | S61-66628 U | 5/1986 | |
| JP | 2003522310 A | 7/2003 | |
| JP | 2008510097 A | 4/2008 | |
| WO | 0073630 A1 | 12/2000 | |
| WO | 2010/068558 A2 | 6/2010 | |

OTHER PUBLICATIONS

International Search Report and Written Opinion received for PCT Patent Application No. PCT/EP2020/068099, mailed on Oct. 14, 2020, 9 pages.

International Search Report and Written Opinion for International patent application No. PCT/EP2020/068099 filed Jun. 26, 2020, mailed Oct. 14, 2020.

* cited by examiner

TURBINE

RELATED APPLICATIONS

The present application is a national phase filing based on and claiming priority to PCT Application No. PCT/EP2020/068099, filed on Jun. 26, 2020, which claims priority to U.K. Application No. 1909345.9, filed on Jun. 28, 2019, the entire disclosures of which being expressly incorporated herein by reference.

FIELD OF THE DISCLOSURE

The present disclosure relates to a turbine. In particular, it relates to a variable geometry turbine having two inlet volutes separated by a dividing wall.

BACKGROUND

Turbochargers are well known devices for supplying air to the intake of an internal combustion engine at pressures above atmospheric pressure (boost pressures). A conventional turbocharger comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the intake manifold of the engine, thereby increasing engine power. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted; a circumferentially extending inlet passageway defined between opposing walls arranged around the turbine chamber; an inlet volute arranged around the inlet passageway; and an outlet passageway extending from the turbine chamber. The passageways and chambers communicate such that pressurised exhaust gas admitted to the inlet volute flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway towards the direction of rotation of the turbine wheel.

Turbines may be of a fixed or variable geometry type. Variable geometry type turbines differ from fixed geometry turbines in that the geometry of the inlet passageway can be varied to optimise gas flow velocities over a range of mass flow rates so that the power output of the turbine can be varied to suit varying engine demands.

In a "swing-vane" variable geometry turbine, the angle of the nozzle vanes can be adjusted so as to control the overall area of the inlet passageway. In a "moving wall" variable geometry turbine, an axially moveable wall member defines one wall of the inlet passageway. The position of the movable wall member relative to a facing wall of the inlet passageway is adjustable to control the axial width of the inlet passageway. Thus, for example, as gas flow through the turbine decreases, the inlet passageway width may be decreased to maintain gas velocity and optimise turbine output. In some arrangements the movable wall member may be a nozzle ring supporting a plurality of nozzle vanes. In different arrangements the nozzle ring may be fixed and the movable wall member may be a shroud plate comprising a plurality of slots for receiving the nozzle vanes.

Turbines may be of a single-entry or multiple-entry type. Single-entry turbines comprise a single inlet volute which typically receives all of the exhaust gas from an internal combustion engine. Multiple-entry turbines comprise more than one volute which typically receive separate streams of exhaust gas from different cylinder banks of an internal combustion engine. One form of multiple-entry turbine is a "twin-entry" turbine in which two volutes extend circumferentially with one another around the turbine axis in angular alignment with one another. In such "twin-entry" turbines, a dividing wall is used to separate the volutes from one another.

In multiple-entry turbines, the exhaust gas streams in the different inlet volutes will exhibit transient pressure pulses caused by the separate cylinder banks. Often this means that when a first volute exhibits high pressure an adjacent second volute exhibits low pressure. If the pressure difference between the two volutes is high enough, this will cause exhaust gas from the first (higher pressure) volute to spill over the dividing wall from into the second (lower pressure) volute. The presence of the high pressure gas in the second volute forms a fluid blockage which may impede exhaust gas flow through the second volute during the next exhaust gas cycle and thereby increase the pumping work required by the engine and resulting in engine energy losses. During the next exhaust gas cycle, high pressure gas in the second volute may spill over the dividing wall into the first volute to form a fluid blockage in the first volute. Such fluid interaction between the different volutes is known as "cross-talk".

The relative pressure difference between the two volutes required for cross-talk to occur can be increased by increasing the length of the dividing wall so that the two fluid streams are kept separate from one another for as long as possible. However, with variable geometry turbines this is often impractical as the presence of the dividing wall may prevent movement of the variable geometry mechanism.

It is one object of the present disclosure to obviate or mitigate one or more disadvantages of known turbines, whether mentioned above or otherwise. It is also an object of the present disclosure to provide for an improved or alternative variable geometry turbine.

SUMMARY OF THE DISCLOSURE

According to a first aspect of the disclosure there is provided a variable geometry turbine comprising:

a turbine wheel supported for rotation about a turbine axis;

a turbine housing comprising a first volute for receiving a first exhaust gas stream from a first fluid source and a second volute for receiving a second exhaust gas stream from a second fluid source; the first volute and the second volute being separated by a dividing wall; and an inlet passageway surrounding the turbine wheel and fluidly connected to the first volute and the second volute; the inlet passageway at least partially defined between a first wall member and a second wall member opposite the first wall member, the first wall member being moveable along the turbine axis to vary the size of the inlet passageway;

wherein a tip of the dividing wall defines a first radius (R1) relative to the turbine axis, and a radially outermost part of the first wall member positioned within the inlet passageway defines a second radius (R2) relative to the turbine axis, and wherein the first radius (R1) is at least around 1% larger than the second radius (R2).

The first and second fluid sources may be separate cylinder banks of an internal combustion engine. The first and second cylinder banks may discharge exhaust gas having a transiently pulsed pressure profiles, which are transferred to the first and second volutes. Due to the transient pressure pulses, during use, the pressure of the exhaust gas in the first volute is often different to pressure of the exhaust gas in the second volute. When the pressure difference between the first and second volutes is large enough (that is to say, when it is above a certain threshold), fluid from the higher pressure volute will spill over the dividing wall into the lower pressure volute. This is known as "cross-talk". The fluid that has spilled over the dividing wall creates a high pressure blockage, and therefore some of the pumping work of the engine is absorbed to overcome the fluid blockage during the next engine cycle. Cross-talk between the two volutes therefore decreases the amount of power produced by the engine, and as such it is desirable to avoid the occurrence of cross-talk if possible.

One way of reducing or avoiding the occurrence of cross-talk is to increase the threshold pressure difference between the two volutes at which cross-talk starts to occur. This is achieved by keeping the fluid streams in the two volutes separate from one another for as long as possible. In a moving-wall type variable geometry turbine it is therefore desirable for the dividing wall to extend as far as possible up to the first wall member (that is to say, the movable wall member, as this is the wall member that is adjustable to block the inlet passageway). However, it has been found that if the tip of the dividing wall is too close to the outermost part of the first wall member, when the first wall member moves axially to vary the size of the inlet passageway, the first wall member will entirely block the outlet of one of the volutes. This will trap exhaust gas within the volute, creating a large back pressure on the cylinder bank associated with the blocked volute. The back pressure will result in engine braking and will decrease the overall power output of the engine system.

It has been found that the blocking effect of the first wall member can be reduced if the tip of the dividing wall is spaced apart from the radially outermost part of the first wall member within the inlet passageway by a certain amount. In particular, it has been determined that the blocking effect is reduced when the first radius R1 (the radius of the tip of the dividing wall relative to the turbine axis) is at least around about 1% larger than the second radius R2 (the radius of the radially outermost part of the first wall member within the inlet passageway relative to the turbine axis). When the first radius R1 and the second radius R2 are in such proportions, this ensures that even when the first wall member is substantially covering the outlet of one of the volutes, there is an adequate gap between the radially outermost part of the first wall member and the tip of the dividing wall for fluid from the substantially blocked volute to pass through, whilst at the same time ensuring that the cross-talk threshold pressure is above an acceptable level.

Although it is generally desirable to reduce the blockage of the volutes caused by the first wall member so as to create more even flow through the two volutes and to avoid reducing the power output of the engine, in some instances the effects of a partial blockage can be harnessed to drive other components of an engine system. For example, the elevated pressure caused by a partial blockage of one of the volutes may be used to drive exhaust gas recirculation via pipework that is fluidly connected to the partially blocked volute upstream of the inlet passageway. The closer the tip of the dividing wall is to the outside of the first wall member, the higher the pressure within the blocked volute and therefore the more useful the partial blockage will be for driving exhaust gas recirculation. However, it has been found that when the first radius (R1) is generally less than 1% larger than the second radius (R2) the fluid blockage causes too much of a detrimental effect on the power output of the engine. Therefore, preferably, the first radius (R1) should be at least around 1% larger than the second radius (R2).

By "a tip of the dividing wall" it is encompassed the innermost part of the dividing wall relative to the turbine axis. In particular, the tip may circumscribe a generally circular line surrounding the turbine axis.

By "a radially outermost part of the first wall member positioned within the inlet passageway" it is encompassed the part of the first wall member that is contained within the inlet passageway that defines the furthest distance from the turbine axis. This is not intended to include the radius of any parts of the first wall member that lie outside of the inlet passageway. As such, the parts of the first wall member that lie outside of the inlet passageway may comprise portions that have a larger radius than the second radius.

The first radius (R1) may be at least around 1.5%, 2%, or 4% larger than the second radius (R2).

The turbine housing may define a tongue extending generally parallel to the turbine axis and the first radius may be substantially equal to a radius defined by a tip of the tongue. In particular, the tongue of the turbine housing may be the part of the turbine housing separating the inlet portions of the first and second volutes and end of the volutes in the direction of fluid flow. Where the tip of dividing wall is aligned with the tip of the tongue, the dividing wall is large enough to cause a high cross-talk pressure threshold without the need to make any adjustments to the tongue geometry, which may affect the circulation of the fluid as it enters the nozzle ring (i.e. any nozzles vanes that may be supported by the first or second wall members). However, in some embodiments, the first radius may be larger or smaller than the radius defined by the tip of the tongue.

The first radius (R1) may be at most around 40%, 25%, 16%, 15%, 10%, 9%, 8% or 7% larger than the second radius (R2). When the radial distance between the tip of the dividing wall and the radially outermost part of the first wall member is increased the threshold pressure at which cross-talk starts to occur begins to decrease. It has been found that the first radius R1 should therefore be at most around 40% larger than the second radius R2. When the first radius R1 and the second radius R2 are in such proportions, this ensures that there is an adequate gap between the radially outermost part of the first wall member and the tip of the dividing wall for fluid to pass through, whilst at the same time ensuring that the cross-talk threshold pressure does not decrease below an acceptable level. In some embodiments, the radius defined by the tip of the tongue is around 25% larger than the second radius (R2), and therefore when the first radius (R1) is at most around 25% larger than the second radius (R2) this may be representative of embodiments in which the tip of the dividing wall is aligned with the tip of the tongue. The first radius R1 may be larger than the second radius R2 by an amount in the range from around 1%, 1.5%, 2%, or 4% to around 7%, 8%, 10%, 25% or 40%.

The first wall member may be a nozzle carrier having one or more axially extending nozzle vanes. In such embodiments, the second wall member may be shroud plate having one or more slots for receiving one or more of the nozzle vanes of the nozzle ring. Alternatively, the first wall member may be a shroud plate having one or more slots for receiving one or more nozzle vanes. In such embodiments, the second wall member may be a nozzle carrier comprising the one or more axially extending nozzle vanes The second wall member may be moveable along the turbine axis to vary the size of the inlet passageway. That is to say, both the first wall member and the second wall member may be axially movable.

The first wall member may comprise a substantially continuous circumferential surface configured to block fluid flow in a radial direction relative to the turbine axis. The circumferential surface of the first wall member forms a barrier preventing the passage of fluid in a radial direction from the volutes towards the turbine wheel. As such, the circumferential surface ensures that the first wall member is able to effectively block at least part of the inlet passageway so as to adjust the flow area of the inlet passageway and control the velocity of the exhaust gas entering the turbine wheel. The circumferential surface may be, for example, an annular flange of a nozzle ring.

The inlet passageway may define a width in a direction parallel to the turbine axis, and wherein the tip of the dividing wall may be substantially aligned with the axial midpoint of the width of the inlet passageway. That is to say, the tip of the dividing wall may axially dissect the inlet passageway at the midpoint between the first and second wall members when the first and/or second wall members are in their fully open positions. By aligning the tip of the dividing wall with the axial midpoint of the inlet passageway, this ensures that the area for flow from the first volute to the inlet passageway is approximately equal to the area for flow from the second volute to the inlet passageway. As such, the flow conditions (i.e. nominal pressure and velocity) are the same at the outlet of both volutes, so that flow through the inlet passageway is as even as possible.

Alternatively, the first and second volutes are asymmetric. In particular, the tip of the dividing wall may be positioned between the first wall member when the first wall member is in a flush position relative to the turbine housing and the axial midpoint of the width of the inlet passageway. That is to say, the tip of the dividing wall may be closer to the first wall member when it is in an open position than it is to the second wall member. Alternatively, the tip of the dividing wall may be positioned between the second wall member and the axial midpoint of the width of the inlet passageway. In particular, if the second wall member is movable, the tip of the dividing wall may be positioned between the second wall member when it is flush with the turbine housing and the axial midpoint of the width of the inlet passageway. When the tip is closer to the first wall member than the second wall member or closer to the second wall member than the first wall member, this will cause the volute on the narrower side of the tip to be partially blocked by the first wall member more easily. This is beneficial for generating a higher back pressure in the partially blocked volute so as to drive exhaust gas recirculation from the partially blocked volute. However, because the tip is radially spaced apart from the first wall member, the volute will not be fully blocked and therefore engine performance will not be negatively affected.

The cross-sectional area of the first volute as measured relative to a plane containing the turbine axis A may be smaller than the cross-section area of the second volute as measured relative to said plane. In particular, the cross-sectional area of the first volute may be around 70% to around 90% of the cross-sectional area of the second volute. Alternatively, the cross-sectional area of the second volute maybe smaller than the cross-sectional area of the first volute by the same amount.

The first volute may define a first volute inlet and the second volute may define a second volute inlet. The first volute inlet and the second volute inlet may be aligned at substantially the same azimuth angle relative to the turbine axis. That is to say, the first and second volute inlets are located at a common angular position relative to the turbine axis.

A portion of the dividing wall between the first volute inlet and the second volute inlet may extend in a direction generally orthogonal to the turbine axis. That is to say, the portion of the dividing wall at the inlet to the turbine housing may extend generally radially relative to the turbine axis. Alternatively, a portion of the dividing wall between the first volute inlet and the second volute inlet may extend in a direction generally parallel to the turbine axis.

According to a second aspect of the disclosure, there is provided a turbocharger comprising a variable geometry turbine according to the first aspect of the disclosure.

According to a third aspect of the disclosure, there is provided a turbine housing for a variable geometry turbine, the turbine housing comprising:

a first volute for receiving a first exhaust gas stream from a first cylinder bank and a second volute for receiving a second exhaust gas stream from a second cylinder bank; the first volute and the second volute being separated by a dividing wall having a circumferentially extending tip;

wherein the tip of the dividing wall defines a first radius (R1) relative to a turbine axis, and an axially movable wall member of the turbine defines a second radius (R2) between the turbine axis and a radially outermost part of the movable wall member positioned within an inlet passageway of the turbine; and wherein the first radius (R1) is at least around 1% larger than the second radius (R2).

Any of the optional features of the first aspect of the disclosure may be applied to the second or third aspects of the disclosure. In particular, the first radius (R1) may be at least around 1.5% 2% or 4% larger than the second radius (R2), and/or the first radius (R1) may be at most around 7%, 8%, 9%, 10%, 15%, 16%, 25%, or 40% larger than the second radius (R2).

BRIEF DESCRIPTION OF THE DRAWINGS

Embodiments of the disclosure will now be described, by way of example only, with reference to the accompanying schematic drawings, in which.

DETAILED DESCRIPTION OF EMBODIMENTS OF THE DISCLOSURE

Figure 1:
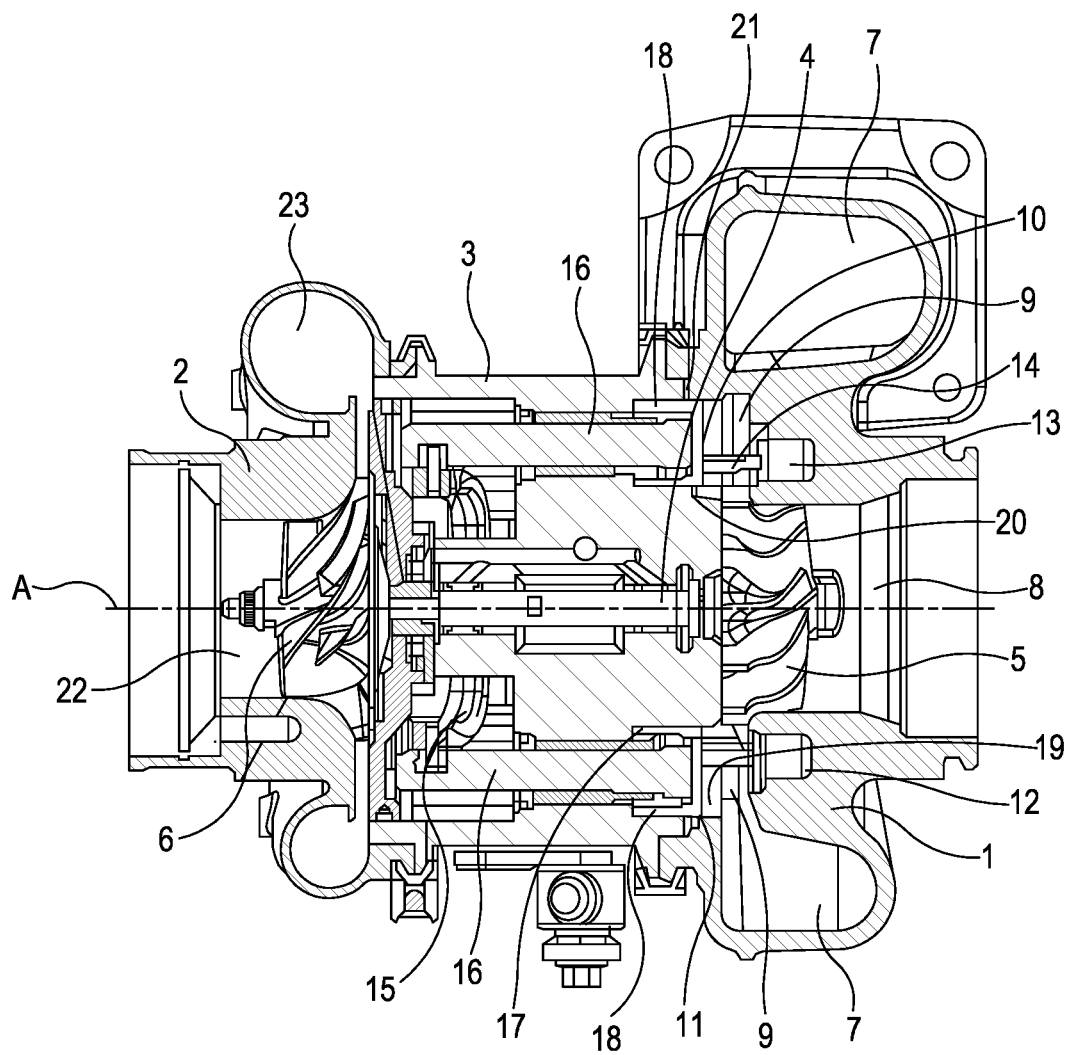
FIG. 1 is an axial cross-section through a known variable geometry turbocharger.

Referring to FIG. 1, this illustrates a known variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about a turbine axis A on bearing assemblies located in the bearing housing 3.

The turbine housing 1 defines an inlet volute 7 to which gas from an internal combustion engine (not shown) is delivered. The exhaust gas flows from the inlet volute 7 to an axial outlet passageway 8 via an annular inlet passageway 9 and the turbine wheel 5. The inlet passageway 9 is defined on one side by a face 10 of a radial wall of an annular first wall member 11, commonly referred to as a "nozzle ring", and on the opposite side by an annular second wall member 12, commonly referred to as a "shroud" which forms the wall of the inlet passageway 9 facing the nozzle ring 11. The nozzle ring 11 is movable along the turbine axis A. The shroud 12 covers the opening of an annular recess 13 in the turbine housing 1. The turbine axis A is the central axis of the turbocharger.

The nozzle ring 11 supports an array of circumferentially and equally spaced nozzle vanes 14 each of which extends across the inlet passageway 9. The vanes 14 are orientated to deflect gas flowing through the inlet passageway 9 towards the direction of rotation of the turbine wheel 5. When the nozzle ring 11 is proximate to the annular shroud 12, the vanes 14 project through suitably configured slots in the shroud 12, into the recess 13.

The position of the nozzle ring 11 is controlled by an actuator assembly of the type disclosed in U.S. Pat. No. 5,868,552. An actuator (not shown) is operable to adjust the position of the nozzle ring 11 via an actuator output shaft (not shown), which is linked to a yoke 15. The yoke 15 in turn engages axially extending actuating rods 16 that support the nozzle ring 11. Accordingly, by appropriate control of the actuator (which may for instance be pneumatic or electric), the axial position of the rods 16 and thus of the nozzle ring 11 can be controlled.

The speed of the turbine wheel 5 is dependent upon the velocity of the gas passing through the annular inlet passageway 9. For a fixed rate of mass of gas flowing into the inlet passageway 9, the gas velocity is a function of the width of the inlet passageway 9, the width being adjustable by controlling the axial position of the nozzle ring 11. FIG. 1 shows the annular inlet passageway 9 fully open. The inlet passageway 9 may be closed to a minimum by moving the face 10 of the nozzle ring 11 towards the shroud 12.

The nozzle ring 11 has axially extending radially inner and outer annular flanges 17 and 18 that extend into an annular cavity 19 provided in the turbine housing 1. Inner and outer sealing rings 20 and 21 are provided to seal the nozzle ring 11 with respect to inner and outer annular surfaces of the annular cavity 19 respectively, whilst allowing the nozzle ring 11 to slide within the annular cavity 19. The inner sealing ring 20 is supported within an annular groove formed in the radially inner annular surface of the cavity 19 and bears against the inner annular flange 17 of the nozzle ring 11. The outer sealing ring 20 is supported within an annular groove formed in the radially outer annular surface of the cavity 19 and bears against the outer annular flange 18 of the nozzle ring 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

Figure 2:
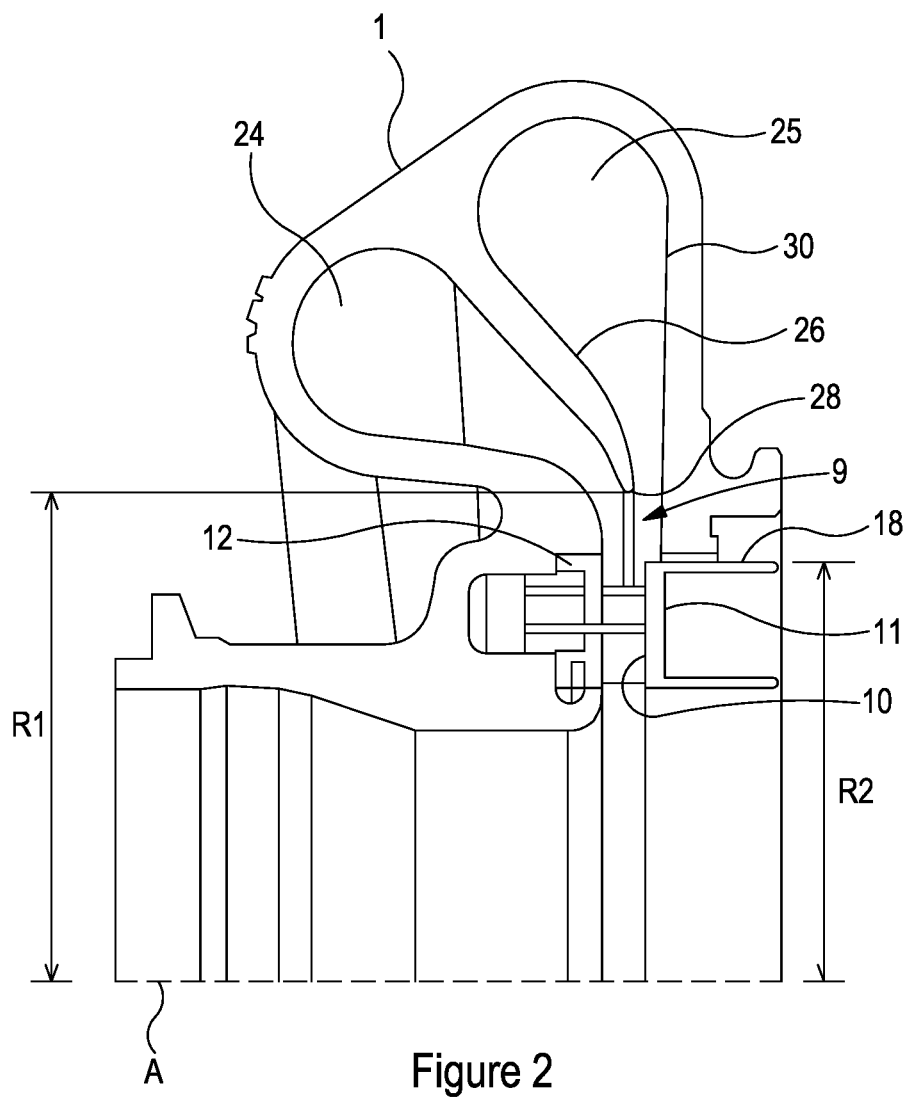
FIG. 2 is a partial axial cross-section through a variable geometry turbine of the present disclosure.

FIG. 2 shows an enlarged view of a portion of a variable geometry turbine in accordance with the present disclosure. The turbine housing 1 defines a first inlet volute 24 and a second inlet volute 25 which are separated by a dividing wall 26. The first volute 24 receives exhaust gas from a first cylinder bank of an internal combustion engine (not shown) and the second volute 25 receives exhaust gas from a second cylinder bank of the internal combustion engine.

The dividing wall 26 defines a tip 28 which is spaced apart from the turbine axis A by a first radius R1. The tip 28 of the dividing wall 26 is defined by the apex of the dividing wall 26 and is the part of the dividing wall 26 that is positioned closest to the turbine axis A. The tip 28 circumscribes a generally circular line concentric to the turbine axis A. The tip 28 of the dividing wall 26 is substantially aligned with the axial midpoint of the inlet passageway 9. That is to say, the tip 28 is positioned approximately half way between the shroud plate 12 and the face 10 of the nozzle ring 11 when the nozzle ring 11 is in its most open position (i.e. when the face 10 of the nozzle ring 11 is flush with a side wall 30 of the turbine housing 1 on the side of the nozzle ring 11). In FIG. 2, the nozzle ring 11 is shown in a partially actuated position. By aligning the tip 28 of the dividing wall 26 with the axial midpoint of the inlet passageway 9, this ensures that the area for flow from the first volute 24 to the inlet passageway 9 is approximately equal to the area for flow from the second volute 25 to the inlet passageway 9. Furthermore, the cross-sectional area of the first volute 24 is substantially the same as the cross-sectional area of the second volute 25. As such, flow through the inlet passageway 9 is as even as possible.

The outer flange 18 of the nozzle ring 11 extends generally axially and is spaced apart from the turbine axis A by a second radius R2. The outer flange 18 defines the radially outermost part of the nozzle ring 11 that is positioned within the inlet passageway 9. During use, when the nozzle ring 11 is actuated, the outer flange 18 extends across the inlet passageway 9 and acts as a barrier to substantially block the flow of fluid from the first volute 24 and/or the second volute 25 in a radial direction with respect to the turbine axis A. The blocked fluid is therefore forced to travel axially and into the space defined between the end face 10 of the nozzle ring 11 and the shroud plate 12.

Each cylinder bank will produce exhaust gas in a transiently pulsatile manner, such that the pressure of the exhaust gas emitted from each cylinder bank will fluctuate with time. During use, often the pressure of the exhaust gas in the first volute 24 is different to the pressure of the exhaust gas in the second volute 25. If the pressure in the first volute 24 is greater than the pressure of the exhaust gas in the second volute 25 by more than a certain threshold amount, high pressure exhaust gas from the first volute 24 will spill over the dividing wall 26 to the second volute 25. The high pressure gas in the second volute 25 will form a fluid blockage impeding delivery of fluid from the second volute 25 to the turbine wheel 5, thus increasing the pumping work required by the engine to overcome the fluid blockage and reducing the amount of power produced by the engine. This spilling of high pressure gas from one volute to the other is referred to as "cross-talk" and the relative difference in pressure between the first and second volutes 24, 25 at which it begins to occur is referred to as the "cross-talk pressure threshold".

Figure 3:
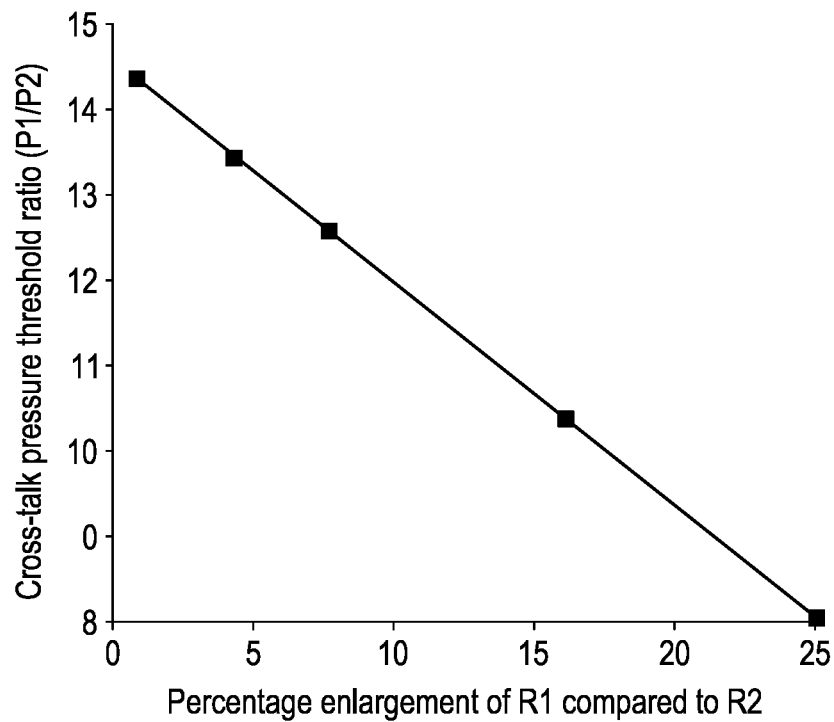
FIG. 3 is a chart showing the relationship between cross-talk pressure threshold and a relative spacing between a tip of a dividing wall and an outer flange of a nozzle ring of a turbine.

The occurrence and effects of cross-talk can be minimised by choosing the geometry of the turbine housing 1 so that the cross-talk pressure threshold is as large as possible. This can be done by keeping the fluid stream in the first volute 24 separate from the fluid stream in the second volute 25 for as long as possible. This relationship is depicted graphically in FIG. 3, which shows the cross-talk pressure threshold as a ratio of the pressure difference between the first and second volutes 24, 25 on the y-axis, versus the percentage size difference between the first radius R1 and the second radius R2 (that is to say the fraction R1/R2 expressed as a percentage value) on the x-axis for an example turbine having a turbine wheel 5 with a radius of 38 mm and a second radius R2 of 59 mm. In particular, the cross-talk pressure threshold ratio is the ratio of the pressure (P1) of the fluid in the first volute 24 to the pressure (P2) of the fluid in the second volute 25. It can be seen that the cross-talk pressure threshold increases as the value of the first radius R1 approaches that of the second radius R2. That is to say, the cross-talk pressure threshold increases the closer that the tip 28 of the dividing wall 26 is to the outer flange 18 of the nozzle ring 11.

However, it has been found that if the tip 28 of the dividing wall 26 is too close to the outer flange 18 of the nozzle ring 11, this can cause the second volute 25 to be entirely blocked by the outer flange 18 when the nozzle ring 11 is actuated. If the second volute 25 is blocked, the fluid in the second volute 25 is trapped causing a large back pressure to be exerted on the engine. This will result in engine braking thus reducing the power produced by the internal combustion engine. Furthermore, none of the fluid from the second volute 25 is passed to the turbine wheel 5 and therefore the efficiency of the turbine also decreases. It is therefore desirable to maintain some spacing between the outer flange 18 of the nozzle ring 11 and the tip 28 of the dividing wall 26 whilst also maintaining a high cross-talk pressure threshold.

Whether or not the second volute 25 is blocked can be determined by measuring a mass flow ratio of the mass flow through the first volute 24 ($\dot{m}1$) to the mass flow through the second volute 26 ($\dot{m}2$) (i.e. the ratio $\dot{m}1/\dot{m}2$). When the mass flow ratio equals 1, the mass flow through the first and second volutes 24, 25 are equal. However, when the second volute 25 is blocked or restricted, the mass flow through the second volute 25 will drop causing the mass flow ratio $\dot{m}1/\dot{m}2$ to increase. It is therefore desirable to maintain the mass flow ratio as close to 1 as possible, whilst ensuring that the cross-talk pressure threshold is sufficiently high.

Figure 4:
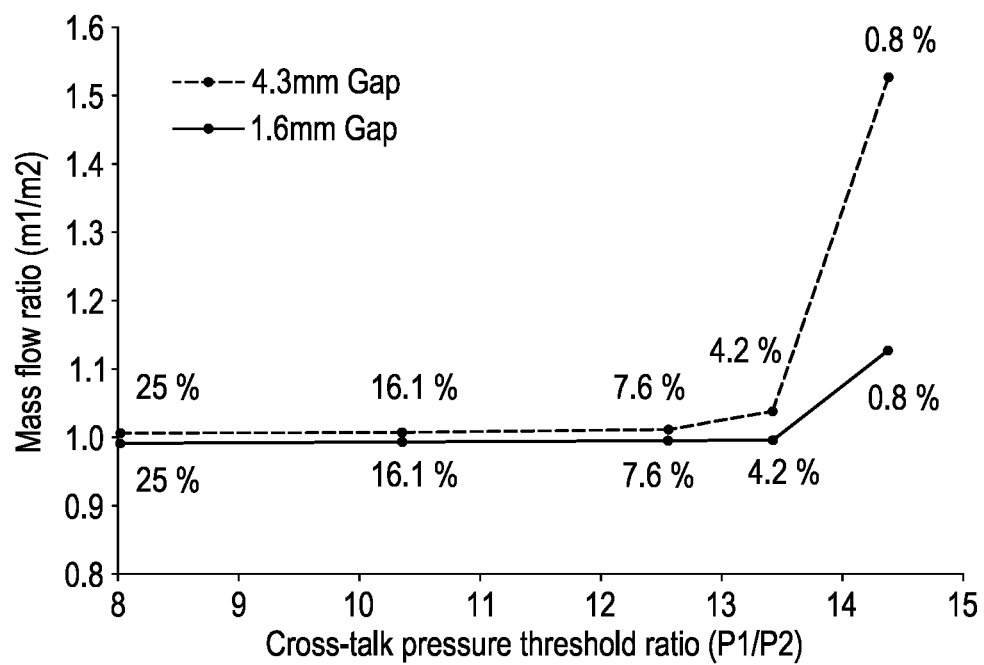
FIG. 4 is a chart showing the relationship between cross-talk pressure threshold and mass flow ratio for different spacing between a tip of a dividing wall and an outer flange of a nozzle ring of a turbine.

FIG. 4 shows the relationship between the mass flow ratio $\dot{m}1/\dot{m}2$ and the cross-talk pressure threshold for different geometries of the dividing wall 26 for two example turbines. The first example turbine has an inlet passageway 9 having a 4.3 mm width measured axially relative to the turbine axis A and the second example turbine has an inlet passageway 9 having a 1.6 mm width measured axially relative to the turbine axis A. Both example turbines have a 38 mm turbine wheel 5 and a second radius R2 of 59 mm. The labels next to each data point on the graph denote the ratio of the first radius R1 to the second radius R2 (i.e. the relative spacing between the tip 28 of the dividing wall 26 and the outer flange 18 of the nozzle ring 11). The data represents the position of the nozzle ring 11 where the face 10 is aligned with the tip 28 of the dividing wall 26 (i.e. when outer flange 18 of the nozzle ring 11 is effectively "blocking" the second volute 25). It can be seen that when the first radius R1 is only 0.8% larger than the second radius R2 (i.e. when the spacing between the tip 28 of the dividing wall 26 and the outer flange 18 of the nozzle ring 11 is relatively narrow), the mass flow ratio $\dot{m}1/\dot{m}2$ is relatively high, thus indicating that flow out of the second volute 25 is impeded by the nozzle ring 11. It can further be seen that when the first radius R1 is 16.1% larger than the second radius R2 (i.e. when the spacing between the tip 28 of the dividing wall 26 and the outer flange 18 of the nozzle ring 11 is relatively large), the cross-talk pressure threshold is relatively low such that cross-talk is more likely to occur. However, when the first radius R1 is 4.2% or 7.6% larger than the second radius R2, the mass flow ratio $\dot{m}1/\dot{m}2$ is relatively low whilst the cross-talk pressure threshold is relatively high. This represents a good trade-off between the requirement to reduce or prevent cross-talk and the need to maintain high flow through the second volute 26.

Through experimentation, it has been found that the first radius R1 should be larger than the second radius R2 by at least around 1%. This represents best performance in relation to the prevention of cross-talk, whilst also allowing sufficient flow through the second volute 25 so as not to affect the performance of the engine. Furthermore, although it is generally desirable to reduce the blockage of the second volute 25 by the nozzle ring 11, in some instances it is possible to harness the increased pressure caused by a partial blockage for useful work. For example, the second volute 25 may be fluidly connected to an exhaust gas recirculation system by pipework upstream of the inlet passageway 9 (whether attached to the turbine housing 1 or upstream of the turbine housing 1). When the nozzle ring 11 is actuated, which may be frequently during use, the nozzle ring 11 will cause a higher pressure in the second volute 25 which can be used to drive exhaust gas recirculation. However, if the first radius R1 is too close to the second radius R2 the amount of blockage will negatively affect the amount of power produced by the engine. It has been found that negative impact on the engine can be avoided if the first radius R1 is larger than the second radius R2 by at least around 1%.

In the embodiment of FIG. 2, the first radius R1 is larger than the second radius R2 by around 10%. Preferably, the first radius R1 should be larger than the second radius R2 by no more than around 10 to 15%. This ensures that flow through the second volute 25 is substantially unimpeded, whilst still providing a relatively high cross-talk pressure threshold. Preferably, the first radius R1 should be larger than the second radius R2 by an amount in any of the ranges of: around 1% to around 40%, around 1% to around 25%, around 2% to around 16%, around 2% to around 8%, around 2% to around 7%, around 4% to around 8%, around 4% to around 7%, or around 9% to around 16%. The first radius R1 may also be larger than the second radius R2 by around 5% or around 6%.

Figure 5:
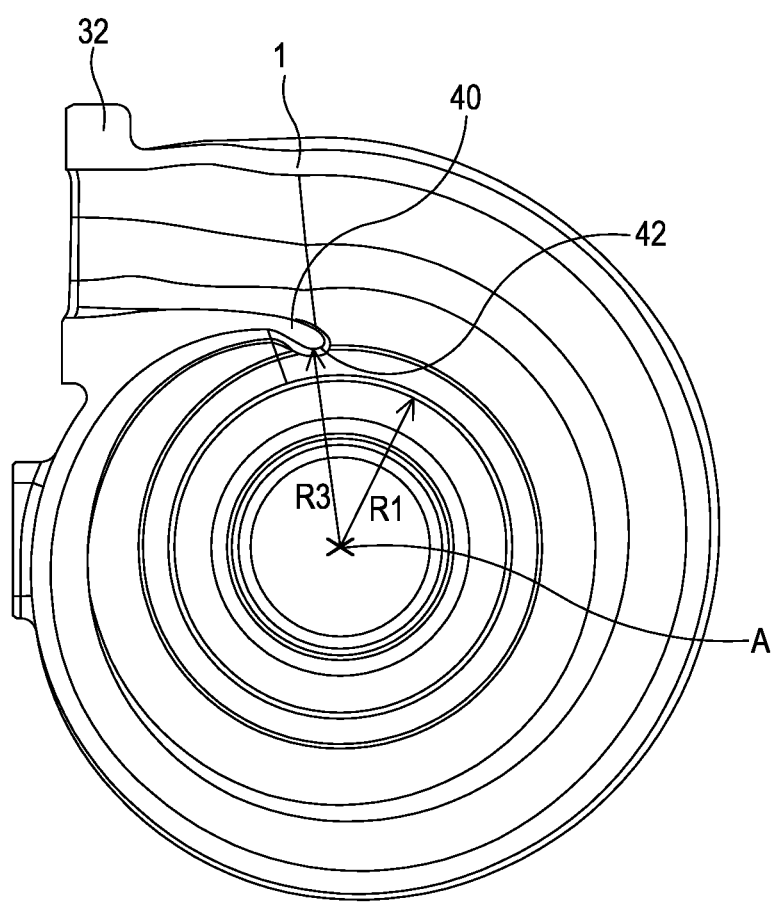
FIG. 5 is a schematic cross-section view of a turbine housing according to the present disclosure.

FIG. 5 shows a cross-sectional view of a turbine housing 1 according to an embodiment of the present disclosure. The turbine housing 1 comprises a tongue 40 which extends generally axially relative to the turbine axis A. The tongue 40 is defined between the inlets of the first and second volutes 24, 25 which receive fluid from the internal combustion engine and the ends of the first and second volutes 24, 25 in the direction of fluid flow. The tongue 40 comprises a tip 42 which is the radially innermost point of the tongue 40 relative to the turbine axis A. The tip 42 of the tongue 40 defines a third radius R3 relative to turbine axis A. The third radius R3 is approximately 25% larger than the second radius R2 (the radius of the outermost part of the nozzle ring 11). In the embodiment shown, the first radius R1 (of the tip 28 of the dividing wall 26) is less than the third radius R3 (of the tip 42 of the tongue 40). It is preferable that the first radius R1 is less than or equal to the third radius R3 as this means that the geometry of the tongue 40 does not need to be adjusted to take account of the presence of the dividing wall 26, and therefore the circulation of the fluid from the first and second volutes 24, 25 into the inlet passageway 9 is unaffected. However, it will be appreciated that in alternative embodiments the first radius R1 (the radius of the tip 28 of the dividing wall 26) may be larger than the third radius R3 (the radius of the tip 42 of the tongue 40).

Figure 6:
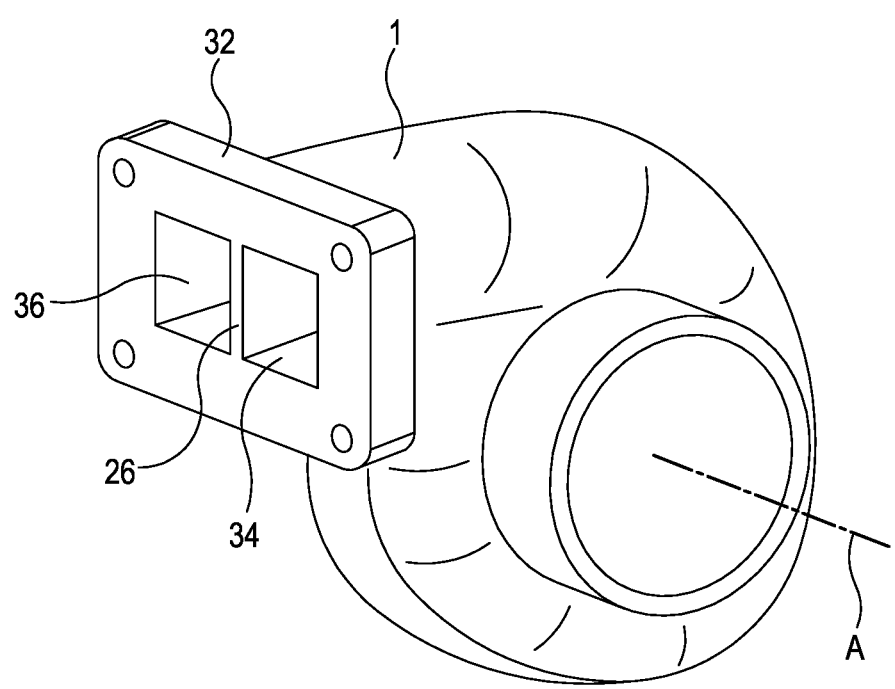
FIG. 6 is a schematic perspective view of an embodiment of turbine housing according to the present disclosure having axially separated volute inlets.
Figure 7:
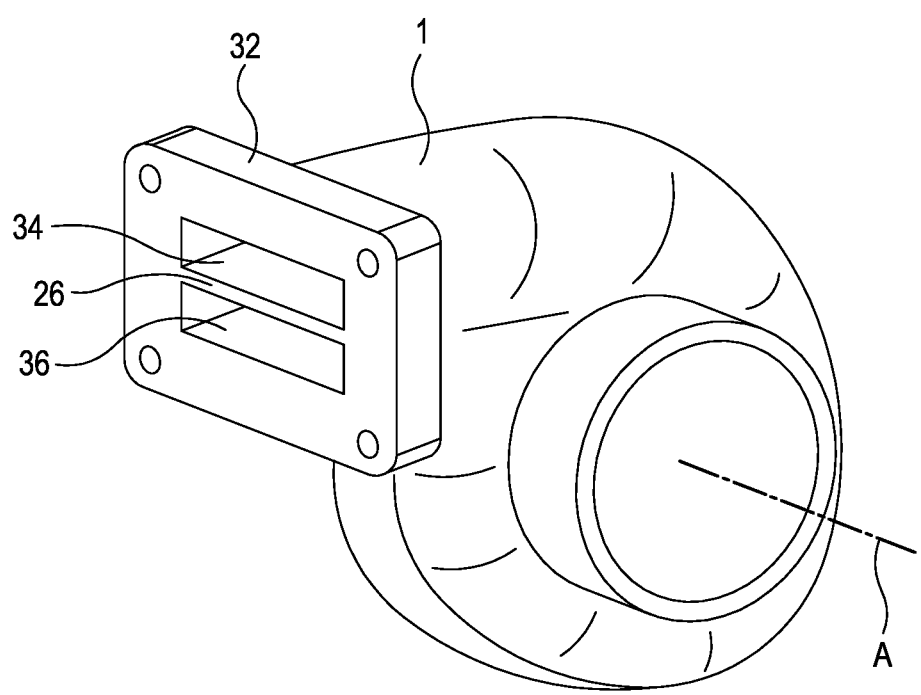
FIG. 7 is a schematic perspective view of another embodiment of a turbine housing according to the present disclosure having radially separated volute inlets.

FIG. 6 shows a turbine housing 1 according to an embodiment of the present disclosure. The turbine housing 1 comprises a mounting flange 32 for mounting the turbine housing 1 to upstream ducting (for example, pipework leading from an internal combustion engine). The turbine housing 1 defines a first volute inlet 34 which is the inlet of the first volute 24, and further defines a second volute inlet 36 which is the inlet of the second volute 25. The first volute inlet 34 and the second volute inlet 36 are aligned at substantially the same azimuth angle relative to the turbine axis. That is to say, the first volute inlet 34 and the second volute inlet 36 are positioned in the same plane and at the same angular position about the turbine axis A. The dividing wall 26 separates the first volute inlet 34 from the second volute inlet 36. The portion of the dividing wall 26 separating the first volute inlet 34 and the second volute inlet 36 extends in a direction generally orthogonal to the turbine axis A. This makes the turbine housing 1 suitable for use in twin-entry systems in which the ducting from the two cylinder banks are positioned axially next to one another with respect to the turbine axis A. An alternative configuration is shown in FIG. 7 in which the portion of the dividing wall 26 between the first volute inlet 34 and the second volute inlet 36 extends in a direction generally parallel to the turbine axis A. This makes the turbine housing 1 suitable for use in twin-entry systems in which the ducting from the two cylinder banks are positioned radially apart from one another with respect to the turbine axis A. In general, it will be appreciated that the mounting flange 32 and the first and second volute inlets 34, 36 can have any suitable configuration to enable them to be connected to upstream ducting for the delivery of exhaust gas.

With reference to FIG. 2, it can be seen that the dividing wall 26 is inclined at an angle relative to the turbine axis A, such that the first and second volutes 24, 25 are asymmetric. The first volute 24 defines a first volute centroid 42 and the second volute 25 defines a second volute centroid 44. Due to the shape of the turbine housing 1 and the bend in the dividing wall 26, the radius of the first volute centroid 42 relative to the turbine axis A is smaller than the radius of the second volute centroid 44 relative to the turbine axis A. Notionally, if both volutes 24, 25 are exposed to the same source the linear velocities of the fluid flowing through both centroids 42, 44 will be approximately equal (although, in practice, each volute is exposed to a different cylinder bank). As the exhaust gas in each volute 24, 25 circulates around the turbine axis A, the angular momentum of the fluid about the turbine axis A is conserved. Because the radius of the first volute centroid 42 is smaller than the radius of the second volute centroid 44, the fluid in the first volute 42 undergoes a smaller change in radius as it moves to the inlet passageway 9 than the fluid in the second volute 25. As such, the angular velocity around the turbine axis A of the fluid entering the inlet passageway 9 from the first volute 24 is smaller than the angular velocity around the turbine axis A of the fluid entering the inlet passageway 9 from the second volute 25. The flow conditions in the two volutes 24, 25 are therefore different, and will exert different back pressures on the engine. As such, it may be necessary to make further adjustments to the geometry of the turbine housing 1 in order to balance the flow conditions between the volutes 24, 25.

Figure 8:
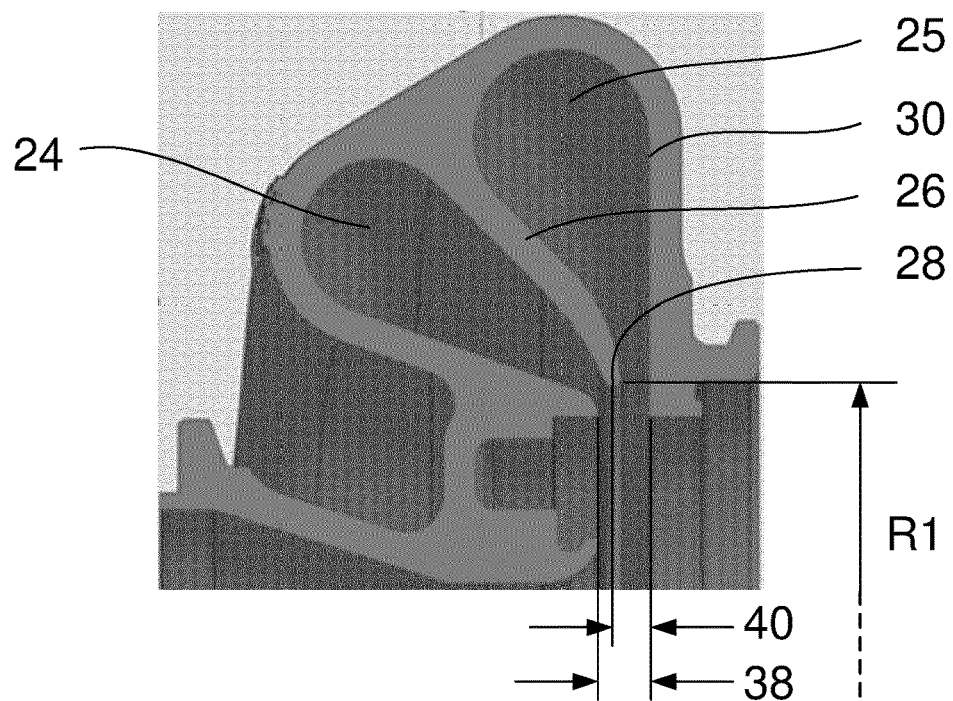
FIG. 8 is a schematic partial axial cross-section through a turbine housing according to an embodiment of the present disclosure in which a dividing wall is positioned asymmetrically in relation to an inlet passageway.

For example, although the tip 28 of the dividing wall 26 of the turbine described above is substantially aligned with the axial midpoint of the inlet passageway 9, it will be appreciated that in alternative embodiments the tip 28 of the dividing wall 26 may be aligned closer to the shroud plate 12 or to the side wall 30 on the side of the nozzle ring 11. That is to say, the tip 28 can be moved to an asymmetric position. FIG. 8 depicts one such embodiment of the disclosure. The inlet passageway 9 defines a width 38 in the direction of the turbine axis between the side wall 30 and the shroud plate 12 (note that in FIG. 8 the shroud plate 12 has been omitted for clarity). The tip 28 of the dividing wall 26 is spaced apart from the side wall 30 by a distance 40, which is more than half of the width 38. The distance 40 is around 62% of the width 38 and is preferably in the range of around 55% to around 70% of the width 38. As such, the area for flow from the first volute 24 to the inlet passageway 9 is smaller than the area for flow from the second volute 25 to the inlet passageway 9.

By reducing the outlet area of the first volute 24, flow through first volute 24 is restricted and the pressure of the first volute 24 will be increased. The increase in pressure of the first volute 24 can be used to balance the flow conditions between the two volutes 24, 25. Furthermore, the increased pressure can be harnessed to drive other parts of the engine system, such as for example for exhaust gas recirculation (i.e. by placing an exhaust gas recirculation line in fluid communication with the first volute 24).

Preferably, if the tip 28 is moved to an asymmetric position between the side wall 30 and shroud plate 12 the tip 28 should also be moved radially closer to the turbine axis A (i.e. to reduce the value of the first radius R1). In the embodiment of FIG. 7, the first radius R1 is larger than the second radius R2 by around 9%. It will be appreciated that in alternative embodiments, the tip 28 of the dividing wall 26 could be moved closer to the side wall 30 by a corresponding amount so that the second volute 25 can be used to drive exhaust gas recirculation.

Figure 9:
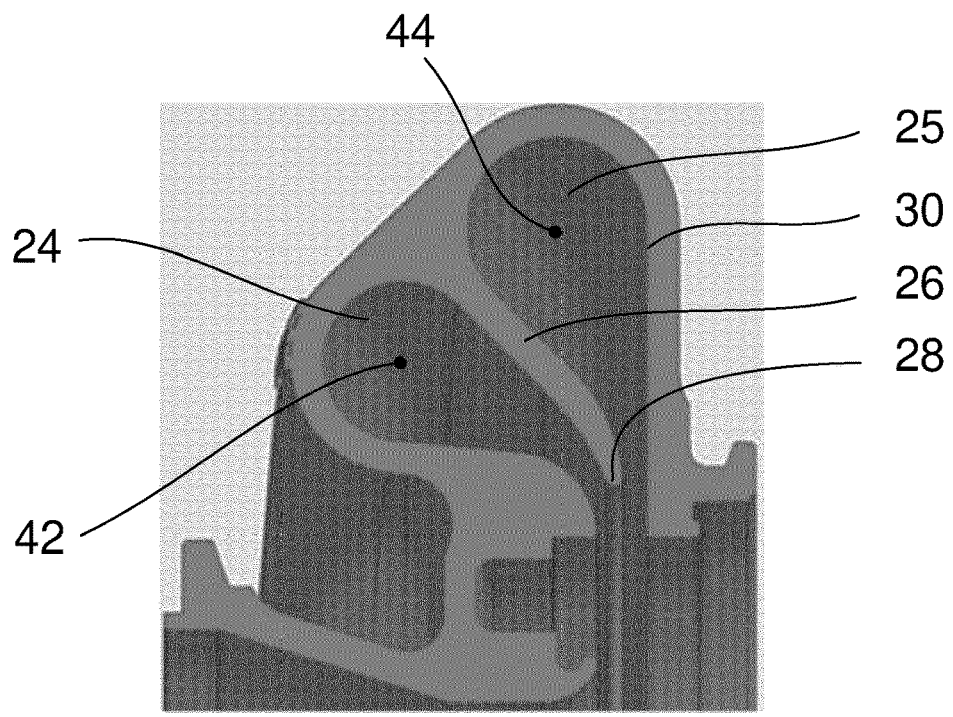
FIG. 9 is a schematic partial axial cross-section through a turbine housing according to an embodiment of the present disclosure in which the turbine volutes define different cross-sectional areas.

Another example of a suitable asymmetric turbine geometry is shown in FIG. 9. In FIG. 9, the cross-sectional area of the first volute 24 is smaller than the cross-sectional area of the second volute 25. The cross-sectional areas of the first and second volutes 24, 25 are the areas of the first and second volutes 24, 25 as measured in a common plane containing the turbine axis A. In particular, the cross-sectional area of the first volute 24 is around 84% of the cross-section area of the second volute 25, and is preferable around 70% to around 90% of the cross-sectional area of the second volute 25. Because the cross-sectional area of the first volute 24 is smaller, the fluid in the first volute 24 has a higher bulk velocity. In particular, the fluid velocity at the first volute centroid 42 is larger than the fluid velocity at the second volute centroid 44. Accordingly, by adjusting the cross-sectional area of the first volute 24, the outlet pressure and velocity of the fluid leaving the first volute 24 in the vicinity of the tip 28 can be made to more closely match the pressure and velocity of the fluid flowing leaving the second volute 25. Thus, the occurrence of cross-talk less is likely.

Although the turbine described above comprises only two volutes 24, 25, it will be appreciated that in alternative embodiments of the disclosure the turbine may comprise more than two volutes, for example three or more volutes. Each adjacent pair of volutes may be separated by a dividing wall 26, provided that the tip 28 of each dividing wall 26 has a radius measured from the turbine axis A that falls within one of the ranges described herein.

Although the turbine described above comprises a movable nozzle ring 11 and a fixed shroud plate 12, it will be appreciated that in alternative embodiments the shroud plate 12 may be movable along the turbine axis A to vary the axial width of the inlet passageway 9. In yet further embodiments, both the nozzle ring 11 and the shroud plate 12 may be independently or co-operatively movable along the turbine axis A to vary the axial width of the inlet passageway 9.

The invention claimed is:

1. A variable geometry turbine comprising:
    a turbine wheel supported for rotation about a turbine axis;
    a turbine housing comprising a first volute for receiving a first exhaust gas stream from a first fluid source and a second volute for receiving a second exhaust gas stream from a second fluid source; the first volute and the second volute being separated by a dividing wall; and
    an inlet passageway surrounding the turbine wheel and fluidly connected to the first volute and the second volute; the inlet passageway at least partially defined between a first wall member and a second wall member opposite the first wall member, the first wall member being moveable along the turbine axis to vary a size of the inlet passageway;
    wherein a tip of the dividing wall defines a first radius (R1) relative to the turbine axis, and a radially outermost part of the first wall member positioned within the inlet passageway defines a second radius (R2) relative to the turbine axis,
    wherein the first radius (R1) is at least 1% larger than the second radius (R2); and
    wherein the first radius (R1) is at most 25% larger than the second radius (R2).

2. The variable geometry turbine according to claim 1, wherein the first radius (R1) is at least 2% larger than the second radius (R2).

3. The variable geometry turbine according to claim 1, wherein the first radius (R1) is at least 4% larger than the second radius (R2).

4. The variable geometry turbine according to claim 1, wherein the turbine housing defines a tongue extending generally parallel to the turbine axis and wherein the first radius is substantially equal to a radius defined by a tip of the tongue.

5. The variable geometry turbine according to claim 1, wherein the first radius (R1) is at most 10% larger than the second radius (R2).

6. The variable geometry turbine according to claim 1, wherein the first radius (R1) is at most 8% larger than the second radius (R2).

7. The variable geometry turbine according to claim 1, wherein the first radius (R1) is at most 7% larger than the second radius (R2).

8. The variable geometry turbine according to claim 1, wherein the first wall member is a nozzle carrier having one or more axially extending nozzle vanes.

9. The variable geometry turbine according to claim 1, wherein the first wall member is a shroud plate having one or more slots for receiving one or more nozzle vanes.

10. The variable geometry turbine according to claim 1, wherein the second wall member is moveable along the turbine axis to vary the size of the inlet passageway.

11. The variable geometry turbine according to claim 1, wherein the first wall member comprises a substantially continuous circumferential surface configured to block fluid flow in a radial direction relative to the turbine axis.

12. The variable geometry turbine according to claim 1, wherein the inlet passageway defines a width in a direction parallel to the turbine axis, and wherein the tip of the dividing wall is substantially aligned with the axial midpoint of the width of the inlet passageway.

13. The variable geometry turbine according to claim 1, wherein the first and second volutes are asymmetric.

14. The variable geometry turbine according to claim 13, wherein a cross-sectional area of the first volute as measured relative to a plane containing the turbine axis is smaller than a cross-section area of the second volute as measured relative to the plane.

15. The variable geometry turbine according to claim 14, wherein the cross-sectional area of the first volute is 70% to 90% of the cross-sectional area of the second volute.

16. The variable geometry turbine according to claim 1, wherein the inlet passageway defines a width in a direction parallel to the turbine axis, and wherein the tip of the dividing wall is positioned between the first wall member when the first wall member is in a flush position relative to the turbine housing and the axial midpoint of the width of the inlet passageway.

17. The variable geometry turbine according to claim 1, wherein the inlet passageway defines a width in a direction parallel to the turbine axis, and wherein the tip of the dividing wall is positioned between the second wall member and the axial midpoint of the width of the inlet passageway.

18. The variable geometry turbine according to claim 1, wherein the first volute defines a first volute inlet and the second volute defines a second volute inlet, wherein the first volute inlet and the second volute inlet are aligned at substantially the same azimuth angle relative to the turbine axis.

19. The variable geometry turbine according to claim 18, wherein a portion of the dividing wall between the first volute inlet and the second volute inlet extends in a direction generally orthogonal to the turbine axis.

20. The variable geometry turbine according to claim 18, wherein a portion of the dividing wall between the first volute inlet and the second volute inlet extends in a direction generally parallel to the turbine axis.

21. The variable geometry turbine according to claim 1, wherein the first radius (R1) is at most 15% larger than the second radius (R2).

22. A turbocharger comprising a variable geometry turbine according to claim 1.

23. A turbine housing for a variable geometry turbine, the turbine housing comprising:
- a first volute for receiving a first exhaust gas stream from a first cylinder bank; and
- a second volute for receiving a second exhaust gas stream from a second cylinder bank;
- the first volute and the second volute being separated by a dividing wall having a circumferentially extending tip;
- wherein the tip of the dividing wall defines a first radius (R1) relative to a turbine axis, and an axially movable wall member of the turbine defines a second radius (R2) between the turbine axis and a radially outermost part of the movable wall member positioned within an inlet passageway of the turbine; and
- wherein the first radius (R1) is at least 1% larger than the second radius (R2); and
- wherein the first radius (R1) is at most 25% larger than the second radius (R2).

24. The turbine housing for a variable geometry turbine according to claim 23, wherein the first radius (R1) is at most 15% larger than the second radius (R2).

* * * * *